F. H. KAUFFOLD.
CORN SHOCKER, CUTTER, AND HARVESTER.
APPLICATION FILED JULY 12, 1911.
1,032,683.
Patented July 16, 1912.
2 SHEETS—SHEET 1.
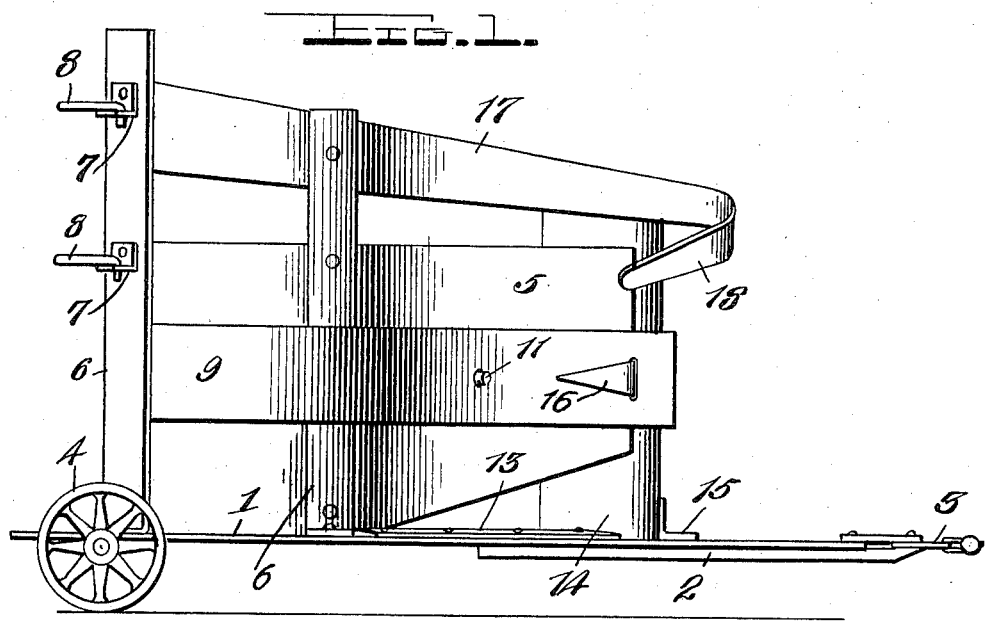
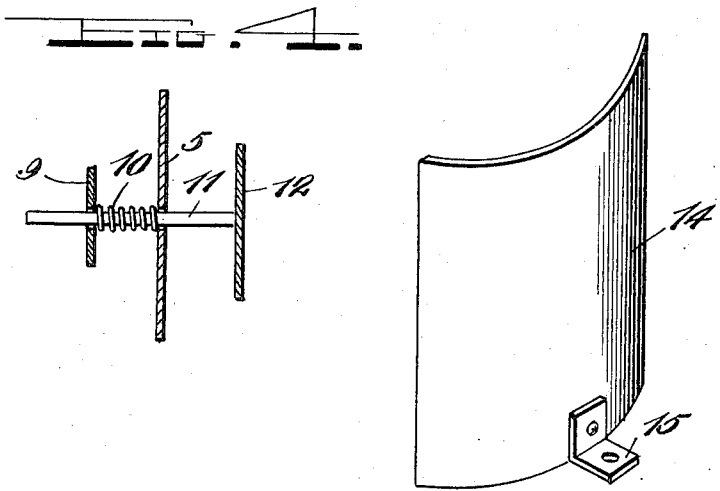
Witnesses
Chas. L. Griestauer.
H. F. McQuay.
Inventor
F. H. Kauffold,
By Watson E. Coleman.
Attorney

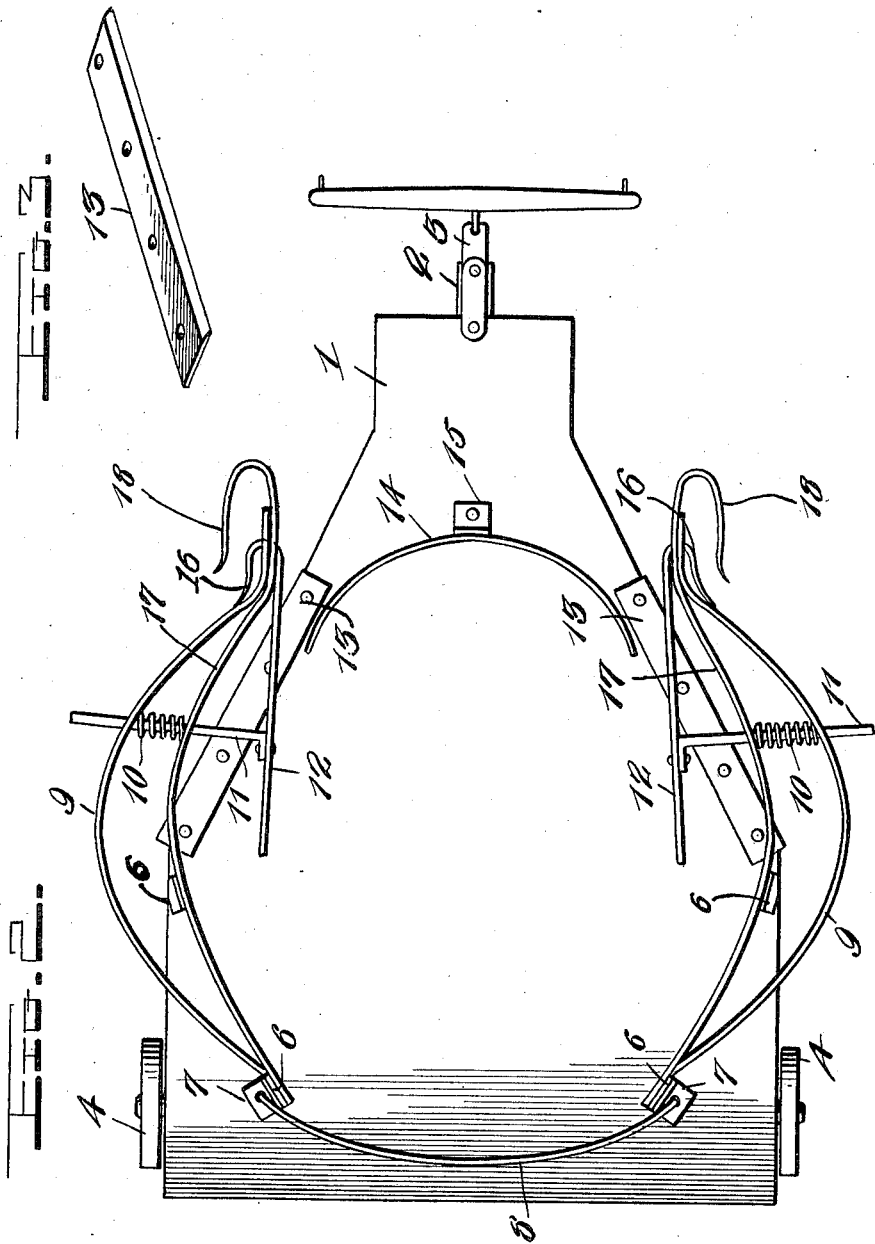

UNITED STATES PATENT OFFICE.

FREDERICK H. KAUFFOLD, OF ALLIANCE, NEBRASKA.

CORN SHOCKER, CUTTER, AND HARVESTER.

1,032,683.   Specification of Letters Patent.   Patented July 16, 1912.

Application filed July 12, 1911. Serial No. 638,096.

*To all whom it may concern:*

Be it known that I, FREDERICK H. KAUFFOLD, a citizen of the United States, residing at Alliance, in the county of Boxbutte and State of Nebraska, have invented certain new and useful Improvements in Corn Shockers, Cutters, and Harvesters, of which the following is a specification, reference being had to the accompanying drawings.

This invention relates to an agricultural apparatus, and more particularly to devices for shocking and collecting corn, and the like.

The object of this invention is to provide a vehicle which will be particularly suitable for shocking and collecting corn, in large quantities.

Another object of this invention is to have the various parts readily removable and accessible, so that they can be easily inspected and repaired should the same be necessary.

A further object is to have it as simple as possible so as to be easily manufactured and at a comparatively small cost, without in any way reducing the efficiency of the machine.

Other objects of this invention will become apparent as it is more fully set forth.

In accordance with this invention there is employed a truck having a suitable number of wheels provided thereon, and properly disposed on the same so that they will be adapted to carry the load of the vehicle conveniently. It is preferable to put these wheels at the back portion of the vehicle in order that the operator who drives the wagon can easily step on the same at any time, and not tip the vehicle, which would cause the corn or the like, in the vehicle to be dumped in a mixed-up manner on the ground. The truck is preferably drawn by a single horse. The inner portion of the vehicle is arranged so as to guide the corn or the like suitably into the vehicle, which is covered by this invention.

In the accompanying drawings which illustrate by way of example an embodiment of this invention, Figure 1 represents a view in elevation of a vehicle embodying this invention. Fig. 2 represents a plan view of Fig. 1. Figs. 3, 4, and 5 are details of various parts of the machine.

Similar reference characters refer to similar parts throughout the drawings.

In the construction which illustrates this invention 1 represents the truck or machine body part of a vehicle used for shocking and gathering corn or the like, and which is provided on its end part with a suitable draw bar 2, that has attached to its upper end portion a link 3, arranged to receive a one horse harness arrangement. The wheels 4 are provided at the end or back portion of the body as a suitable support of the truck.

Mounted on the body proper are a pair of curvilinear sides 5 that are arranged to project slightly beyond the edge of the body proper at the front portion of the vehicle, as clearly shown in the drawings. These sides are suitably supported in position by uprights 6 arranged on and secured to the body proper of the vehicle, the back uprights are arranged with lips 7, in which are removably disposed the cross pieces or gates 8, in order to permit easy access to the interior of the car, from the back portion thereof. Secured to the uprights 6 are a pair of braces 9 which are arranged to extend outwardly from the middle portion of the sides 5 in order to permit springs 10 to be inserted in between for actuating the bars 11 on which a pair of hinged blades 12 are secured. These hinged blades are secured to the outer portion of the braces 9, as well as is the outer portion of the sides 5, as can be readily seen from the drawings. Disposed on the upper portion of the body 1 and below the lower edges of the sides 5 are disposed removable knives 13 which are relatively long in order to permit a long cutting action on the corn that is caught by the vehicle, as it travels across the field.

In order to guide the corn suitably into the vehicle there is provided on the front portion of the same a U shaped piece 14 preferably made of metal or other resilient material so that the corn will be pushed against the blade 12 and on to the knives 13. Attaching means 15 that secure the part 14 to the body are suitably arranged to assist in this action. The part 14 is designed so as to be easily removed and changed, should the same be desirable at any time, and the same characteristic is provided for in the blades 12, which are arranged so as to be easily removable with the hinges 16 that secure them to the braces 9.

In operation the vehicle is pulled across the field in which the desired cereal is growing and the blades 12 engage with the growing stalks and push them toward the knives 13, thereby causing them to be cut and fall into the vehicle within the sides 5. As the stalks fall the pieces 14 tend to direct them into the interior of the vehicle and assist, as it were, the blades in their action. As the corn comes in contact with the blade it slides from the front portion to the back portion of the same, and presses the blades 12 outwardly, which under the action of the springs 10 causes the corn to keep in contact with the blades sufficiently to cause it to be cut and fall into the interior of the vehicle.

Should the operator desire to remove the cut material, he simply enters through the back portion or gate of the vehicle and ties it in suitable bundles or lifts it out in armfuls, and disposes it on the ground.

As the knives 13 get blunt their bolts, which are clearly indicated in the drawings, are unloosened or removed, so that the knives can be lifted off and changed, and in the same manner, the blades 12 as they become worn by constant friction of the corn against their surface, can be removed by unloosening the screws that fasten them to the bars 11. In the same manner the U shaped piece 14 can be readily removed and changed as it is worn from constant use.

Referring to the drawings it will be noticed that a pair of pieces 17 are provided on the upper portion of the upright 6 and have their outer ends 18 suitably turned back in order to afford a smoother action to them as they engage with the upper portion of the stalks that are being cut. These pieces are provided in order to afford strength to the sides of the vehicle and also to assist the holding of larger quantities of material at the same time. They are separate because they do not have to stand the wearing action that the lower parts of the sides 5 have to undergo, so that in case the latter portions are removed at any time, these upper portions 17 can remain in place. In securing the parts 17 they are disposed so that their back ends are higher than the front portions, because the material that is cut and lies in the vehicle, will tend to pile up higher in the back portion of the vehicle, than in the front.
Obviously while there is shown but one construction of this invention it is not desired to limit this application for a patent in any way otherwise than necessitated by the prior art, as many modifications in the construction of this invention may be made without departing from the principles thereof.

Having thus described this invention it is claimed:
1. A machine for shocking corn and the like, comprising in combination a body proper, a plurality of sides disposed on the upper portion of said body, and having their end portions projecting beyond the edges of said body, uprights for supporting said sides, knives disposed on the edges of said body, and arranged to engage with the growing corn and the like, blades disposed on said projecting portions of the sides, hinged thereto and arranged to guide the corn and the like onto the said knives and to the interior of said machine, springs disposed on said machine for pressing said blades against the in-coming corn.

2. A machine for shocking corn and the like, comprising in combination a body proper, a plurality of sides disposed on said body, a plurality of uprights for supporting said sides, a plurality of braces for said sides, a plurality of removable knives disposed on the edges of said machine and arranged to engage with and cut the growing corn and the like, a plurality of hinged blades disposed on said sides and arranged to guide the corn and the like to said knives and to the interior of the machine, bars disposed on and secured to said blades, and resilient means for actuating said bars for keeping the blades against the in-coming corn and the like, and a U shaped piece removably and centrally disposed on said machine between said blades for assisting in the guidance of the corn into the same, and gate pieces disposed on the back portion of said vehicle.

3. A machine for shocking corn and the like, comprising in combination a body proper, a plurality of wheels for supporting said body, a plurality of uprights disposed on said body, a plurality of sides disposed on said uprights, having their end portions extending beyond the outer edges of said body, said sides being removably secured to said uprights, a plurality of braces disposed on said uprights, a plurality of removable knives disposed on said vehicle and adapted to cut growing corn and the like, a plurality of removable blades disposed on said braces and arranged to engage with the in-coming corn and the like, and press the same onto said knives, resilient means for keeping said blades in position, a removable U shaped piece centrally disposed on said body between said blades and arranged to assist in guiding the in-coming corn to the interior of the vehicle, a plurality of upper pieces disposed on the upper portions of said uprights and arranged to form portions of the guideway, means for securing an animal to the machine, for drawing it across the field.

In testimony whereof I hereunto affix my signature in the presence of two witnesses.

FREDERICK H. KAUFFOLD.

Witnesses:
F. W. HARRIS,
F. B. McDONALD.

Copies of this patent may be obtained for five cents each, by addressing the "Commissioner of Patents, Washington, D. C."